Sept. 5, 1967    A. J. KISCELLUS ETAL    3,339,737
WATER SOFTENER REGENERATING MEANS
Filed March 15, 1963
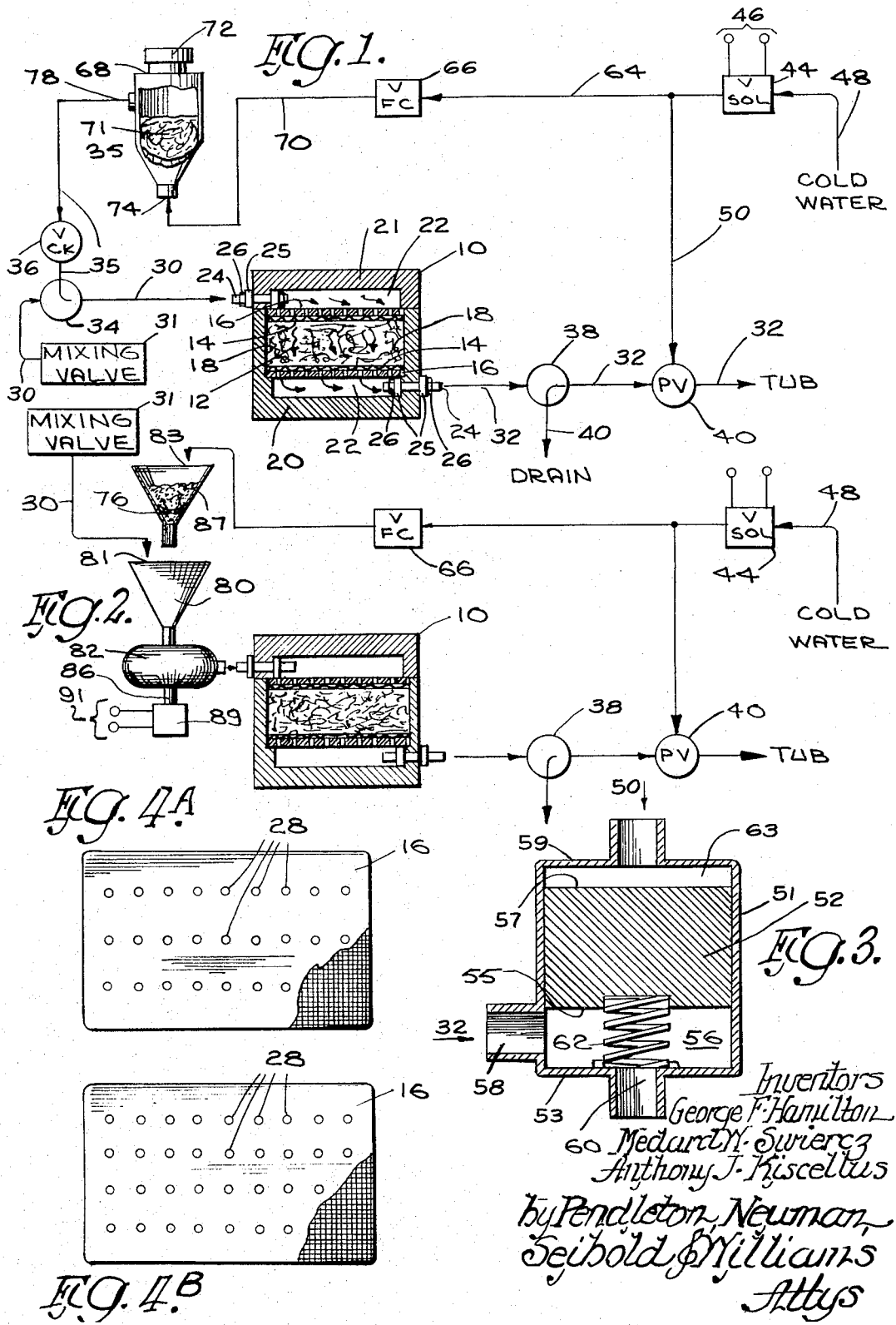

United States Patent Office 3,339,737
Patented Sept. 5, 1967

3,339,737
WATER SOFTENER REGENERATING MEANS
Anthony J. Kiscellus, 5301 N. Lockwood, 60630;
Medard W. Swiercz, 5348 N. Luna 60630; and
George F. Hamilton, 5629 N. Austin Ave. 60646;
all of Chicago, Ill.
Filed Mar. 15, 1963, Ser. No. 265,429
6 Claims. (Cl. 210—134)

This invention relates to water softeners and more particularly to water softeners employing ion exchange resins to soften water by removing therefrom calcium ions, magnesium ions, and the like.

Such softeners, which have been known in the prior art, have been relatively bulky and expensive, which disadvantages have restricted the use of such softeners. Another disadvantage of prior art softeners is that they present a relatively great pressure drop across the resin bed, with the result that the rate of water flow therethrough is limited. Moreover, efforts to increase rates of flow through such softeners have resulted in a decrease of their ability to soften the water, due to the effect known as channeling by which a relatively large proportion of the water to be softened finds a path through the resin bed substantially out of contact with the resin particles.

It is, accordingly, a principal object of the present invention to provide a small, lightweight, inexpensive water softener, adapted to be regenerated each time it is used, thereby to provide for increased efficiency of use of the ion exchange resin.

Another object of the present invention is to provide a water softener adapted to be regenerated automatically in response to an electrical signal.

A further object of the present invention is to provide a water softener adapted to operate as an attachment to an electrically controlled automatic clothes washer, dish washer, or the like, to soften the water used in the operation of such device, and to automatically regenerate the ion exchange resin during a period in which no water is entering the device.

A further object of the present invention is to provide a water softener with a resin bed having a relatively large ratio of cross-sectional area (in a plane transverse to the direction of flow) to the thickness of the bed in the direction of flow, and means for evenly distributing the water over the cross-sectional area, to create a negligible pressure drop across the resin bed without any channeling effect.

These and other objects and advantages of the present invention will be more fully understood by reference to the accompanying specification, claims and drawings.

In one embodiment of the present invention, there is provided an ion exchange resin tank having inlet and outlet ports and a resin bed with a relatively high ratio of cross-sectional area of the flow path to the length of the bed in the direction of the flow, and a connection for furnishing water to be softened to the inlet port of the resin tank. The outlet port of the resin tank is normally connected to a device utilizing the softened water, but is selectively connected to a drain. A salt container for storing a quantity of regenerating salt has an inlet connected to a source of water through an electrically controlled valve and an outlet connected to the inlet port of the resin tank. The electrically controlled valve, when actuated, permits water to flow through the salt container to the inlet port of the tank, and from the outlet port of the tank to the drain. The outlet port of the tank is simultaneously disconnected from the water utilization device and connected to the drain when the electrically controlled valve is actuated. The resin in the tank is thus regenerated, and the deactuation of the electrically controlled valve readies the apparatus for a further water softening cycle.

In another embodiment of the present invention, there is provided an air gap in the regenerating flow to prevent any regenerating salt from entering the water supply.

Reference will now be made to the accompanying specification and drawings in which:

FIG. 1 is a schematic diagram of one embodiment of the water softener of the present invention;

FIG. 2 is a schematic diagram of another embodiment of the present invention;

FIG. 3 is a section of a pilot, or hydrodynamic, valve employed with the embodiments of FIGS. 1 and 2; and FIGS. 4A and 4B are illustrations of two alternative baffle arrangements which may be employed with either embodiment of the present invention.

Referring now to FIG. 1, there is illustrated at 10 an ion exchange resin tank including a bed 12 of ion exchange resin. In the preferred embodiment the resin is a cation exchange resin having active acidic components such as $SO_3H$, $COOH$, $PO(OH)_2$, etc. which enables the resin to readily eliminate calcium ions, magnesium ions, and the like from water passing therethrough. Such resins are well-known in the prior art, and are identified by such trade names as "Dowex," "Amberlite," or the like. A pair of screens 14 are disposed between the resin bed 12 and a pair of baffles 16, one on each side of the resin bed 12; and the entire assembly including the resin bed 12, the baffles 16 and the screens 14 are disposed in a recess 18 in the interior of a casing of the tank 10.

The casing of the tank 10 comprises a body section 20 and a cover section 22 which are cemented together to maintain a fluid-tight seal between the two respective sections. The casing is preferably composed of a moldable plastic material, such as epoxy resin or the like.

The resin bed 12 is held by the baffles 16 in a central location in the tank 10, and a chamber 22 between each of the baffles 16 and the opposing interior walls of the tank 10. Each chamber 22 communicates with a port through a tube 24. Each tube 24 is secured to a wall of the tank 10 by means of a pair of nuts 26 disposed on the inside and outside of the tank wall and threaded on the tubes 24, and a fluid-tight seal is maintained by resilient washers 25 disposed on both sides of the wall between the wall and the nuts 26.

Referring to FIG. 4, there are illustrated two alternative forms of a baffle 16 which may be employed with the present invention. Each of the baffles, illustrated in FIG. 4, is provided with a plurality of apertures substantially evenly distributed over the surface of the baffle. The baffle of FIG. 4A has a lesser number of apertures 28 than that of FIG. 4B, but they are of a greater diameter. The diameter of each of the apertures 28 is chosen so that the total area of all of the apertures 28 in each baffle 16 is at least equal to the cross-sectional area of the interior of the port tubes 24. This is to insure that the baffles 16 do not impart an added resistance of the flow of fluid through the tank 10. In FIGS. 4A and 4B, the screen 14 is also illustrated which is preferably composed of 60 mesh brass screen, the purpose of which is to prevent the resin particles from escaping through the apertures 28 in the baffle 16.

The apparatus of FIG. 1 is intended to be employed with an electrically controlled water utilization device such as an automatic clothes washer or dish washer. When used with an automatic washing machine, the inlet of the system is connected to the outlet of the mixing valve 31 of the washer by a line 30. The mixing valve mixes the hot and cold water from corresponding water inlets to the machine to arrive at the appropriate temperature for the type of wash being processed and the portion of the washing cycle being performed at any given time. This water normally is introduced into the washing tub, but in the present invention is diverted through the tank 10 before reaching the tub. The mixing valve outlet is connected to the inlet of the tank 10 by the line 30 and the outlet of the tank 10 is connected to the washer tub by an outlet line 32, whereby all of the water flowing to the tub of the washer is passed through the resin tank 10.

Between the mixing valve and the tank 10, a venturi or aspirator 34 is disposed in the line 30, which venturi serves to prevent the water in the line 30 from flowing upwardly from the venturi 34 into the regenerating flow path through the line 35. A check valve 36 in the line 35 also prevents such upward flow. Such venturis are well-known in the art, and, therefore, will not be specifically described.

A second venturi 38 and a pilot (or hydraulically actuated) valve 40 are disposed in the outlet line 32. The pilot valve 40 is controlled by water pressure in the line 50 and normally permits flow through the outlet line 32 during the softening portion of the cycle of operation, viz., when water is flowing between the mixing valve and the tub through the tank 10. The venturi 38 is also connected to a drain through a line 42, but water flowing through the line 32 does not flow out through the line 42 to the drain, but instead a low pressure is created in the line 32 which draws air into the line 32 through the venturi 38, thus aerating the water flowing through the line 32. An air gap (not shown) is provided between the outlet of the line 42 and the drain inlet, to prevent drawing water from the drain into the stream flowing into the line 32.

The resin bed 12 of the tank 10 contains a sufficient quantity of ion exchange resin to soften the amount of water required for each washing cycle. When the washer requires about 35 or 40 gallons for each cycle, a resin bed of approximately 28 cubic inches has been found to be ample to soften this quantity of water.

During a portion of the washer cycle in which water is not required to be admitted to the tub, a solenoid valve 44 is actuated by an electrical signal applied to the terminals 46 from the timer of the automatic washer. The valve 44 thereupon opens to admit cold water from the cold water main along the line 48. Water then flows through the line 48 through the solenoid valve 44 to the line 50 which is connected to the control port of the pilot valve 40. The pilot valve 40 then closes, preventing any flow in the line 32.

Referring to FIG. 3, there is illustrated a cross-sectional view of the pilot valve 40. The valve 40 comprises a casing 51 forming a hollow cylinder in which there is mounted a piston 52. The piston 52 is in sealing engagement with the interior wall of the cylinder 51. A chamber 56 is formed at one end of the cylinder 51 between an end wall 53 thereof and an end wall 55 of the piston 52. An inlet port 58 and an outlet port 60 each communicate with the chamber 56, to normally permit a flow of water through the line 32 to which the ports 58 and 60 are connected. The piston 52 is urged toward the position shown in FIG. 3 by a spring 62 acting between the end wall 55 of the piston 52 and the end wall 53 of the cylinder 51. In this position of the piston 52 there is an unobstructed path between the ports 58 and 60 through the chamber 56.

When the solenoid valve 44 opens, however, water from the main is admitted to the line 51 and to a control port 62 which opens into a chamber 63 bounded by an end wall 57 of the piston 52 and an end wall 59 of the cylinder 51, forcing the piston 52 to move against the force of the spring 62 and seal off the port 58 from the chamber 56. This prevents any flow in the line 32.

The outlet of the solenoid valve 44 is also connected to a line 64 which is connected to a flow control valve 66. The flow control valve 66 may be any of those well-known in the prior art and preferably comprises a washer disposed within the flow path, having an orifice or aperture of a reduced diameter to permit a flow of only a specified rate when subjected to a given pressure. This flow is preferably approximately ¼ gallon per minute, at water main pressure, and the water on line 64 is passed at this rate from the flow control valve 66 through a line 70 to a salt container 68.

The salt container 68 is a hollow chamber adapted to hold a brine solution 71 containing a measured quantity of regenerating salt. The salt container 68 is equipped with a removable lid 72 whereby salt may conveniently be added to the chamber 68. The inlet port 74 is connected to the line 70 to permit water in the line 70 to enter the chamber 68 and force the brine 71 out the outlet port 78, which is disposed at a higher elevation than the inlet port 74. The brine 71 is thus confined to the container 68 until water enters the inlet port 74. The outlet port 78 is connected to the check valve 36 in the line 35. When the preferred ion exchange resins are used, the regenerating salt comprises NaCl, or ordinary table salt. The salt is preferably iodized, which has been found to have a sterilizing effect on the resin tank 10 in reducing the bacteria in the resin bed 12. The check valve 36 is oriented so as to permit the flow of brine from the salt container 68, and the brine flows from the check valve 36 into the venturi 34, and thence into the tank 10.

It will be recalled that the regenerating flow through lines 64, 70 and 35 is initiated only during a time in the washer cycle when no water is passing the mixing valve in the line 30, and so the brine flows from the venturi 34 into the tank 10, through the resin bed 12, and regenerates the ion exchange properties of the resin bed 12 Since the pilot valve 40 is closed during regeneration, the brine emanating from the outlet of the tank 10 is forced out of the venturi 38 into the line 42 connected to the drain, so that the brine does not enter the tub of the washer, but is instead exhausted into the drain. When the amount of water required to be softened by the tank 10 is of the order of 35 or 40 gallons, it has been found that a charge of salt deposited into the container 68 of about four or five tablespoons is sufficient to completely regenerate the resin bed 12. Complete regeneration of the resin bed 12 is effected in about three minutes, and water flows through the resin bed 12 for the remainder of the time that the electrical signal from the washer timer exists on the terminals 46 of the solenoid valve 44, to rinse the tank 10 and wash all of the residual salt into the drain through the line 42. When the signal on the terminals 46 of the solenoid valve 44 terminates, the valve 44 closes, thereby terminating the regenerating flow and opening the pilot valve 40; and the apparatus is ready for a further softening cycle.

The agitating cycle of an automatic washing machine normally lasts longer than three minutes, and this is the portion of the washing machine cycle during which regeneration is preferably made to occur Alternatively, the spin-dry portion of the cycle may be employed to control regeneration of the tank 10. The terminals of the washer timer to which the terminals 46 of the solenoid valve 44 are connected for actuation of the valve 44 during any desired portion of the washer cycle may vary from washer to washer, but the correct connections will be apparent to those skilled in the art for each machine.

It will be appreciated that since the resin bed 12 is regenerated once during each washing cycle, a very much smaller quantity of resin is required than in prior art systems in which regeneration was effected only occasionally. The present invention makes much more efficient use of the resin in that a smaller amount of resin is required to soften the water, due to its relatively frequent regeneration. Moreover, no special steps need be taken to regenerate resin bed 12 other than adding the requisite amount of salt to the salt container 68 once during each washing cycle. This may be done at any time, but preferably the salt is added a few minutes before the regeneration portion of the washer cycle, to permit the salt to dissolve into a brine 61. It is not essential for the salt to be completely dissolved, but this is preferred because it reduces regeneration time and also reduces the quantity of salt required for regeneration. It is necessary to replace the lid of the salt container 68, before the regeneration cycle, to avoid overflow of the brine from the container 68.

It should be noted that the resin bed 12 has a relatively high ratio of cross-sectional area in a direction transverse to the flow therethrough, in relation to the length of the flow path therethrough. Thus, in a typical embodiment, the resin bed 12 is only about 1¾ inches thick, while the size of the bed is about 3½ × 5⅛. This provides a ratio of area-to-length of about ten to one.

When the ratio of area-to-length is high, as in the present apparatus, the resistance to flow of water therethrough is lessened, so that there is very little back pressure across the resin bed 12. This is important in applications with automatic washing machines, since the mixing valves of such machines are not designed for a high pressure on the tub side of the valve, and may fail if subjected to a high pressure.

It was previously thought, by those skilled in the water softening art, that if large ratios of area-to-length were employed, the efficiency of the ion exchange properties of the resin would be decreased due to an effect known as "channeling." Channeling occurs in prior art water softeners at high rates of flow, and the term "channeling" describes the effect produced when the water flowing through the resin bed redistributes the resin particles in the bed so as to form channels for the water substantially out of contact with any of the resin particles. The ion exchange function cannot then take place, and the water emanating from the bed is not effectively softened.

In the present apparatus, however, the baffles 16 distribute the water flowing through the resin bed 12 substantially evenly over the area of flow, so that no channeling takes place. Resistance to channeling is also increased in the present invention by a construction of the resin tank 10 in which the resin bed 12, when regenerated and at its maximum volume, completely fills the space in the tank 10 between the opposing screens 18 and baffles 16, as illustrated.

The chambers 22 adjacent the inlet and outlet tubes 24 each have a relatively large volume and serve to equalize the pressure of the water in these chambers, so that the water pressure is substantially constant over the entire area of the baffles 16. This also promotes uniform water flow through the apertures 28 in the baffles 16.

It should also be noted that the inlet and outlet tubes 24 of the tank 10 are symmetrically disposed, such that either tube 24 may be used as an inlet, and the other as an outlet. After a long period of use of the present invention, the tank is preferably reversed so that the inlet tube 24 becomes the outlet and vice versa. This reversal permits any foreign matter which may have collected on the inlet screen 14 and baffle 16 to be dislodged and rinsed down the drain during regeneration. The tank 10 may then be left in its reversed configuration until another long period of use expires without experiencing any decrease in efficiency.

Referring now to FIG. 2, there is illustrated a second embodiment of the present invention. The apparatus illustrated in FIG. 2 is generally similar to that of FIG. 1, and corresponding portions of the apparatus have been given like reference numerals.

The apparatus of FIG. 2 differs from that of FIG. 1 by providing a first air gap 81 between the inlet of the tank 10 and the line 30, and a second air gap 83 between the inlet of the tank 10 and the salt container 85. Water flowing through the line 30 passes through the air gap 81 into a funnel 80 which guides the water to the inlet of a centrifugal pump 82. The outlet 84 of the centrifugal pump 82 is connected to the inlet tube 24 of the tank 10.

The centrifugal pump 82 compensates for the reduction in pressure caused by the air gap in line 30. Although the resistance to the flow of water through the tank 10 is small, the flow therethrough cannot keep up with the flow of the water through the mixing valve into the line 30. The pump 82, however, restores the pressure so that the water flows rapidly through the tank 10 into the tub of the washer without spilling over the funnel 80. The pump 82 also serves to aerate the water being introduced into the washer tub through the resin tank 10, by drawing air through the funnel 80 in addition to the water from the mixing valve.

The purpose of the air gap provided in the line 30 is to prevent any reverse flow through the line 30 which might be caused by failure of some portion of the apparatus through long use.

The salt container in FIG. 2 is in the form of a funnel 85 equipped with a screen 76 to hold the salt 87 in place while it is in its solid state. No lid need be provided for the salt container 85 since the ¼ gallon per minute flow of water during the regeneration cycle is sufficiently low to permit the salt 87 to dissolve and run into the funnel 80 leading to the inlet of the pump 82, without overflowing the salt container 85. The speed of the pump 82 is sufficiently high to prevent the funnel 80 from overflowing during regeneration. The purpose of the air gap 83 is to prevent salt from flowing into the main through the line 48, due to some malfunction of the apparatus. In all other respects the construction and operation of the apparatus of FIG. 2 is like that illustrated in FIG. 1.

The centrifugal pump 82 is preferably driven by an electric motor 89 connected to its drive shaft 86. The motor terminals 91 are connected to the timer of the automatic washer, and energized thereby at each portion of the washing cycle in which water is required to be entered into the washer tub, and also during the regeneration cycle which is preferably the agitating portion of the washer cycle. Alternatively, the drive shaft 86 may be connected directly to the washing machine motor by a gear, belt or the like, to cause the pump 82 to operate whenever the motor of the washing machine is energized. This modification is suitable for use in machines in which the washing machine motor is energized at all times when water is being introduced into the tub, as well as during the agitator cycle. Another alternative is to connect the pump 82 to the shaft of a turbine connected in series with the line 30 such that the turbine is rotated by the water entering the tank 10 through the line 30. This modification is suitable when the flow-control valve 66 limits the regenerating flow sufficiently to prevent the overflow of the funnel 80 during regeneration.

Although the present invention has been described particularly with reference to an automatic washing machine, it should be obvious that it may be equally as well employed with any electrically controlled water utilization device such as an automatic dish washer or the like. When so used, the solenoid valve 44, and the motor 91 in the embodiment of FIG. 2, is connected to the timer of the dish washer so as to energize the regenerating flow path during a portion of the dish washing cycle that does not require the addition of water to the washing apparatus. In the embodiment of FIG. 2, the motor 89 is connected to be energized when water is being introduced into the device and during regeneration, as described above.

The regeneration of the resin bed 12 requires the addition of a quantity of salt to the salt container 68 during each complete cycle of the dish washing apparatus. Apart from this, no special attention to the softener or regenerating apparatus need be given by the user.

The foregoing will so completely and fully describe the present invention as to enable those skilled in the art to make and use the same. It will be evident, however, that certain changes and modifications may be made, by applying current knowledge, to adapt the present invention to varying conditions of service, without departing from the essential items of novelty involved, which are intended to be defined and secured by the appended claims.

What is claimed is:

1. A water softener adapted for association with an electrically controlled water utilization device comprising a tank including a bed of ion exchange resin, means for permitting a flow of water to be softened through said tank to said utilization device whereby said water is softened, selectively operable regenerating means for permitting a flow of brine through said tank to regenerate said resin, said regenerating means including a salt chamber, an electrically operable valve for admitting water to said salt chamber and passing said salt through said tank, and a hydraulically operable valve responsive to said electrically operable valve to disconnect said tank from said utilization device and to operatively connect said tank to a drain.

2. Apparatus according to claim 1, including flow control means for limiting the rate of flow of said regenerating flow.

3. Apparatus according to claim 2 including a check valve in the flow path of said regenerating flow, whereby fluid may flow through said regenerating path and through said tank in only the same direction as the flow of said softened water through said tank.

4. Apparatus according to claim 1, including a venturi connected between the inlet port of said tank and the source of water to be softened said venturi being connected with a portion of said regenerating flow path and operable to prevent said water to be softened from flowing through said regenerating path.

5. In a water softening system including a utilization device and a resin tank connected with said utilization device for furnishing softened water thereto, the combination comprising means for conducting a flow of regenerating fluid through said tank to a drain, valve means for selectively preventing said regenerating fluid from entering said utilization device, and separate means for conducting said regenerating fluid to said drain, said valve means having a single inlet port, a single outlet port, and a single control port, said inlet port being connected to said tank, said outlet port being connected to said utilization device, said valve being operable to normally interconnect said inlet and outlet ports and being selectively operable to interrupt said connection in response to a predetermined pressure at said control port.

6. In a water softening system including a utilization device and a resin tank connected with said utilization device for furnishing softened water thereto, the combination comprising means for conducting a flow of regenerating fluid through said tank to a drain, valve means for selectively preventing said regenerating fluid from entering said utilization device, and separate means for conducting said regenerating fluid to said drain, said valve being connected between said tank and said utilization device, and said separate means comprises an aspirator connected between said tank and said valve, the main ports of said aspirator being connected with said tank and said valve, respectively, and the auxiliary port of said aspirator being connected to a source of atmospheric pressure, said aspirator being oriented to cause the pressure in said drain line to be less than atmospheric in response to flow from the tank through said valve to the tube, said auxiliary port serving as a drain for fluid from said tank when said valve is closed.

References Cited

UNITED STATES PATENTS

| | | | |
|---|---|---|---|
| 24,489 | 6/1859 | Rice | 210—278 |
| 1,142,194 | 6/1915 | Morgan | 251—63 |
| 2,112,290 | 3/1938 | Holland | 103—262 |
| 2,292,814 | 8/1942 | Bariffi | 68—13.1 |
| 2,304,454 | 12/1942 | Gudmundsen | 68—13.1 |
| 2,434,353 | 1/1948 | Edwards | 210—190 X |
| 2,825,348 | 3/1958 | Low | 134—58 |
| 2,825,666 | 3/1958 | Stoddard | 210—142 X |
| 3,126,335 | 3/1964 | Stipe | 210—134 X |
| 3,148,687 | 9/1964 | Dosch | 210—191 X |

REUBEN FRIEDMAN, *Primary Examiner.*

F. SPEAR, *Assistant Examiner.*